O. F. STEDMAN.
Clothes-Pounders.
No. 166,424.
Patented Aug. 3, 1875.
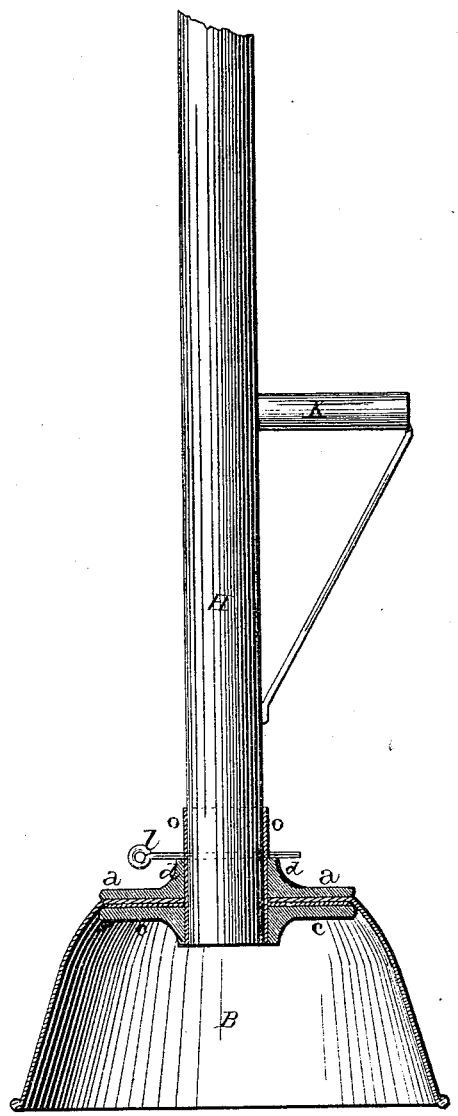
WITNESSES.
INVENTOR
O. F. Stedman
per
F. A. Lehmann, Atty

UNITED STATES PATENT OFFICE.

OSCAR F. STEDMAN, OF WESTFIELD, NEW YORK.

IMPROVEMENT IN CLOTHES-POUNDERS.

Specification forming part of Letters Patent No. 166,424, dated August 3, 1875; application filed July 21, 1875.

*To all whom it may concern:*

Be it known that I, OSCAR F. STEDMAN, of Westfield, in the county of Chautauqua and State of New York, have invented certain new and useful Improvements in Clothes-Pounders; and I do hereby declare the following to be a full, clear, and exact description of the invention, such as will enable others skilled in the art to which it pertains to make and use it, reference being had to the accompanying drawings, which form part of this specification.

My invention relates to an improvement in the construction of clothes-pounders; and it consists in the arrangement and combination of devices that will be more fully described hereinafter, whereby the dish or basin is both strengthened and braced in position, and made removable from the handle.

The accompanying drawing represents a side elevation of my invention, partly in section.

B represents an inverted dish or basin, through the top of which is made a suitable opening, so as to receive the lower end of the handle H. To the inner and outer side of this top are applied the two metal disks or plates, $a$ $c$, for the purpose of bracing the dish or basin, and to make it removable from the handle, so that the parts can be freed from all moisture. Where the basin is made of sheet metal, and is not thus braced, they very soon become broken, as there is not sufficient strength in the solder to resist the pressure necessary in their use; and where they cannot be taken off, so as to dry the moisture in the crevices, they soon become rust-eaten and weak.

In the center of the top is made an orifice of sufficient size to admit the socket or thimble $o$ of the inner disk or plate $c$, and into this socket or thimble is inserted the wooden handle H, by which the washer is to be wielded.

This disk or plate is made of the full size of the flat part or top of the basin B, and is made slightly concave on its inner surface, so that it will press firmly against the inner surface of the basin at the point of curvature or periphery of the disk.

It is well to use a packing of suitable material between this disk and the basin to render it air-tight. The socket or thimble which is attached to this disk extends to a considerable distance upon the handle H.

A disk, $a$, is made, of corresponding size and shape to the disk $c$, and is provided with short thimble $d$, having aperture large enough to allow it to be passed over and upon the socket $o$, to fit it upon the outer surface of the top of the basin B, the two disks being firmly fastened together by the pin or key $l$, passing through a lateral orifice in the socket $o$ and handle H, so as to press upon the top of the outer thimble $d$ of the disk $a$, thus holding the top of the basin B firmly between the two disks, thus rendering the apparatus very strong for use.

To clean and dry, it is only necessary to remove the pin or key $l$, when all the parts can be got at readily. For greater convenience in using, I attach to the upright handle H a cross-handle, K, as shown.

Having thus fully described my invention, what I claim, and desire to secure by Letters Patent, is—

In connection with a clothes-pounder, the combination of the disks $c$ and $a$ with the basin B, substantially in the manner and for the purpose set forth.

In testimony that I claim the foregoing I have hereunto set my hand this 29th day of June, 1875.

O. F. STEDMAN.

Witnesses:
 A. F. PHELPS,
 ROSS KNIGHT.